United States Patent
Osada et al.

(10) Patent No.: US 11,984,555 B2
(45) Date of Patent: *May 14, 2024

(54) SULFIDE-BASED SOLID ELECTROLYTE, METHOD FOR PRODUCING THE SULFIDE-BASED SOLID ELECTROLYTE, AND METHOD FOR PRODUCING ALL-SOLID-STATE BATTERY

(71) Applicant: TOYOTA JIDOSHA KABUSHIKI KAISHA, Toyota (JP)

(72) Inventors: Naoki Osada, Sunto-gun (JP); Ayano Kobayashi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/185,437

(22) Filed: Mar. 17, 2023

(65) Prior Publication Data

US 2023/0231188 A1    Jul. 20, 2023

Related U.S. Application Data

(63) Continuation of application No. 17/403,951, filed on Aug. 17, 2021, now Pat. No. 11,637,314, which is a
(Continued)

(30) Foreign Application Priority Data

May 18, 2018    (JP) .................................. 2018-096514

(51) Int. Cl.
  *H01M 10/0562*    (2010.01)
  *H01M 10/0525*    (2010.01)

(52) U.S. Cl.
  CPC ... *H01M 10/0562* (2013.01); *H01M 10/0525* (2013.01); *H01M 2300/008* (2013.01)

(58) Field of Classification Search
  CPC ......... H01M 10/0562; H01M 10/0525; H01M 2300/008
  See application file for complete search history.

(56) References Cited

U.S. PATENT DOCUMENTS

| | | | |
|---|---|---|---|
| 11,217,821 B2 | 1/2022 | Osada | |
| 2012/0189918 A1* | 7/2012 | Tatsumisago | ..... H01M 10/0562 65/33.1 |

(Continued)

FOREIGN PATENT DOCUMENTS

| | | |
|---|---|---|
| CN | 103650231 A | 3/2014 |
| JP | 2014-212065 A | 11/2014 |

(Continued)

OTHER PUBLICATIONS

The Decision to grant a Patent issued by SIPO (Year: 2022).*
(Continued)

*Primary Examiner* — Alexander Usyatinsky
(74) *Attorney, Agent, or Firm* — Sughrue Mion, PLLC (57) ABSTRACT

Provided is a method for producing a sulfide-based solid electrolyte with a balance between the ion conductivity of the sulfide-based solid electrolyte and the heat generation amount of an electrode layer containing the sulfide-based solid electrolyte during an electrode reaction. Disclosed is a method for producing a sulfide-based solid electrolyte comprising a sulfide glass-based material that contains at least one lithium halide compound selected from the group consisting of LiI, LiBr and LiCl, the method comprising immersing the sulfide glass-based material, which is at least one sulfide glass-based material selected from the group consisting of a sulfide glass and a glass ceramic, in an organic solvent having a solubility parameter of 7.0 or more and 8.8 or less, for 1 hour to 100 hours.

3 Claims, 1 Drawing Sheet

Related U.S. Application Data continuation of application No. 16/403,779, filed on May 6, 2019, now Pat. No. 11,217,821.

(56) References Cited

U.S. PATENT DOCUMENTS

| | | | |
|---|---|---|---|
| 2014/0141341 A1 | 5/2014 | Ohtomo et al. | |
| 2016/0043430 A1 | 2/2016 | Lee | |
| 2016/0164136 A1* | 6/2016 | Higuchi | H01M 10/0525 429/323 |
| 2017/0077547 A1* | 3/2017 | Takami | H01M 4/5815 |
| 2017/0214081 A1 | 7/2017 | Tsuno et al. | |
| 2017/0250403 A1 | 8/2017 | Iwasaki | |
| 2019/0356017 A1 | 11/2019 | Osada | |
| 2021/0376379 A1 | 12/2021 | Osada | |

FOREIGN PATENT DOCUMENTS

| | | |
|---|---|---|
| JP | 2016-134302 A | 7/2016 |
| JP | 2016134302 A * | 7/2016 |
| JP | 2016-207421 A | 12/2016 |
| WO | 2016/013224 A1 | 1/2016 |

OTHER PUBLICATIONS

Corrected Notice of Allowability issued by USPTO in U.S. Appl. No. 16/403,779, dated Dec. 2, 2021.
Non-Final Office Action issued by USPTO in U.S. Appl. No. 16/403,779 dated May 18, 2021.
Hansen solubility parameters (Year: 2013).
Notice of Allowance issued by USPTO in U.S. Appl. No. 16/403,779, dated Aug. 26, 2021.
The Decision to grant a Patent issued by JPO for Application No. 2018096514 Year 2022.
Non-Final Office Action issued USPTO in U.S. Appl. No. 17/403,951 dated Sep. 13, 2022.
Notice of Allowance issued by USPTO in U.S. Appl. No. 17/403,951 dated Dec. 21, 2022.

* cited by examiner

SULFIDE-BASED SOLID ELECTROLYTE, METHOD FOR PRODUCING THE SULFIDE-BASED SOLID ELECTROLYTE, AND METHOD FOR PRODUCING ALL-SOLID-STATE BATTERY

CROSS-REFERENCE

This is a continuation of application Ser. No. 17/403,951 filed Aug. 17, 2021, which is a continuation of application Ser. No. 16/403,779 filed May 6, 2019, now U.S. Pat. No. 11,217,821, claiming priority from Japanese Patent Application No. 2018-096514 filed May 18, 2018, which is incorporated herein by reference.

TECHNICAL FIELD

The disclosure relates to a sulfide-based solid electrolyte, a method for producing the sulfide-based solid electrolyte, and a method for producing an all-solid-state battery.

BACKGROUND ART

In recent years, with the rapid spread of IT and communication devices such as personal computers, camcorders and cellular phones, great importance has been attached to the development of batteries that can be used as the power source of such devices. In the automobile industry, etc., high-power and high-capacity batteries for electric vehicles and hybrid vehicles are under development.

Of all-solid-state batteries, an all-solid-state lithium ion secondary battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent. Also, various studies have been conducted on sulfide-based solid electrolyte as the solid electrolyte.

In Patent Literature 1, it is disclosed to produce a sulfide-based all-solid-state battery by use of an alkali metal sulfide having a specific surface area of 10.0 m$^2$/g, which is a specific surface area measured by the BET method.

Patent Literature 2 discloses a sulfide-based all-solid-state battery in which a cathode active material layer contains, with respect to its mass, 0.078 mass % to 0.330 mass % of butyl butyrate.

CITATION LIST

Patent Literature 1: Japanese Patent Application Laid-Open (JP-A) No. 2014-212065
Patent Literature 2: JP-A No. 2016-134302

SUMMARY OF INVENTION

Technical Problem

In an all-solid-state battery comprising an electrode of conventional electrode structure, a heat generation reaction occurs on a contact surface between a solid electrolyte and an active material. Therefore, there is a problem of large heat generation and low electrode thermal stability.

A sulfide-based solid electrolyte used in an electrode material is required to have high ion conductivity.

In light of the above circumstance, an object of the disclosed embodiments is to provide a sulfide-based solid electrolyte with a balance between the ion conductivity of the sulfide-based solid electrolyte and the heat generation amount of an electrode layer containing the sulfide-based solid electrolyte during an electrode reaction, a method for producing the sulfide-based solid electrolyte, and a method for producing an all-solid-state battery.

Solution to Problem

In a first embodiment, there is provided a method for producing a sulfide-based solid electrolyte comprising a sulfide glass-based material that contains at least one lithium halide compound selected from the group consisting of LiI, LiBr and LiCl, the method comprising immersing the sulfide glass-based material, which is at least one sulfide glass-based material selected from the group consisting of a sulfide glass and a glass ceramic, in an organic solvent having a solubility parameter of 7.0 or more and 8.8 or less, for 1 hour to 100 hours.

The organic solvent may be butyl butyrate.

When the sulfide glass-based material is a sulfide glass, the method for producing the sulfide-based solid electrolyte may further comprise heating the sulfide glass at a temperature higher than a crystallization temperature (Tc) of the sulfide glass, which is a temperature observed by thermal analysis measurement, thereby obtaining a glass ceramic.

In another embodiment, there is provided a method for producing an all-solid-state battery comprising a cathode layer that contains the sulfide-based solid electrolyte obtained by the above-mentioned production method.

In another embodiment, there is provided a sulfide-based solid electrolyte comprising a sulfide glass-based material that contains at least one lithium halide compound selected from the group consisting of LiI, LiBr and LiCl, wherein a specific surface area of the sulfide-based solid electrolyte measured by the BET method, is from 10 m$^2$/g to 35 m$^2$/g.

Advantageous Effects of Invention

According to the disclosed embodiments, a sulfide-based solid electrolyte with a balance between the ion conductivity of the sulfide-based solid electrolyte and the heat generation amount of an electrode layer containing the sulfide-based solid electrolyte during an electrode reaction, a method for producing the sulfide-based solid electrolyte, and a method for producing an all-solid-state battery, can be provided.

BRIEF DESCRIPTION OF DRAWING

In the accompanying drawing,
The FIGURE is a schematic view of an all-solid-state battery obtained by the production method of the disclosed embodiments.

DESCRIPTION OF EMBODIMENTS

Figure 1:
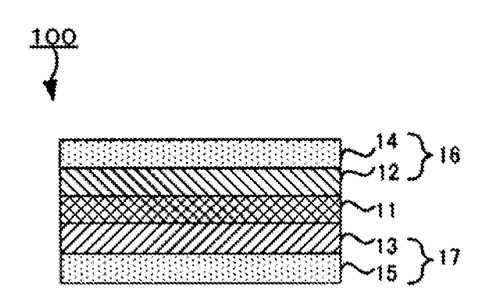

1. Method for Producing Sulfide-Based Solid Electrolyte
The sulfide-based solid electrolyte production method according to the disclosed embodiments, is a method for producing a sulfide-based solid electrolyte comprising a sulfide glass-based material that contains at least one lithium halide compound selected from the group consisting of LiI, LiBr and LiCl, the method comprising immersing the sulfide glass-based material, which is at least one sulfide glass-based material selected from the group consisting of a sulfide glass and a glass ceramic, in an organic solvent having a solubility parameter of 7.0 or more and 8.8 or less, for 1 hour to 100 hours.

A problem with all-solid-state batteries is that heat generation occurs in an electrode material and causes a reduction in the thermal stability of the electrode.

It was found that even when a heat generation reaction occurs on a contact surface between a sulfide-based solid electrolyte and an active material, an increase in the heat generation amount of the whole electrode is suppressed as long as the sulfide-based solid electrolyte has a desired porosity and a desired crystallinity.

In particular, by forming a sulfide-based solid electrolyte into a glass ceramic, the ion conductivity and crystallinity of the sulfide-based solid electrolyte are increased. Moreover, by forming the sulfide-based solid electrolyte into a porous solid electrolyte, the heat dissipating performance of the sulfide-based solid electrolyte is increased. Finally, by using the sulfide-based solid electrolyte in an electrode layer, the thermal stability of the electrode layer can be increased.

In addition, by lengthening the time for immersion of the sulfide-based solid electrolyte in an organic solvent, the BET specific surface area of the sulfide-based solid electrolyte is increased to increase the porosity, and the heat generation amount of the electrode layer containing the sulfide-based solid electrolyte is further decreased.

The sulfide-based solid electrolyte according to the disclosed embodiments comprises a sulfide glass-based material that contains at least one lithium halide compound selected from the group consisting of LiI, LiBr and LiCl.

The type of elements contained in the sulfide glass-based material, can be confirmed by an inductively coupled plasma atomic emission spectrometer, for example.

As the sulfide glass-based material, examples include, but are not limited to, a sulfide glass and a glass ceramic. From the viewpoint of increasing ion conductivity, the sulfide glass-based material may be a glass ceramic.

In the disclosed embodiments, the glass ceramic is a material obtained by crystallizing a sulfide glass. For example, by an X-ray diffraction method, it is possible to check whether the sulfide glass-based material is a glass ceramic or not.

In the disclosed embodiments, a sulfide glass-based material having a crystallinity of from 60% to 80%, which is measured by an X-ray diffraction method, is referred to as the glass ceramic.

Also in the disclosed embodiments, the sulfide glass refers to a material synthesized by amorphizing a raw material composition. The sulfide glass means not only "glass" in a strict sense, for which crystal periodicity is not observed by X-ray diffraction measurement or the like, but also materials in a general sense, which are synthesized by amorphization by the below-described mechanical milling. Accordingly, even when a material is observed by X-ray diffraction measurement or the like and a peak derived from a raw material (such as LiI) is observed, the material corresponds to a sulfide glass as long as it is a material synthesized by amorphization.

The ion conductivity of a glass ceramic is higher than that of a sulfide glass, for example. Therefore, an all-solid-state battery comprising a glass ceramic can obtain lower internal resistance than an all-solid-state battery comprising a sulfide glass.

The sulfide-based solid electrolyte according to the disclosed embodiments may contain at least one sulfide glass-based material selected from the group consisting of a sulfide glass and a glass ceramic. From the viewpoint of increasing ion conductivity, the sulfide-based solid electrolyte may contain a glass ceramic.

The sulfide-based solid electrolyte according to the disclosed embodiments may contain at least the sulfide glass-based material. The sulfide-based solid electrolyte may be composed of only the sulfide glass-based material.

The raw material composition of the sulfide-based solid electrolyte of the disclosed embodiments, contains a Li element, an S element, and at least one halogen element selected from the group consisting of I, Br and Cl. As needed, it further contains at least one selected from the group consisting of a P element, an O element and an S element.

As the raw material composition, examples include, but are not limited to, a material having the composition of $a(LiX)\cdot(1-a)(bLi_2S\cdot(1-b)P_2S_5)$ (where X is at least one halogen element selected from the group consisting of I, Br and Cl; "a" corresponds to the total proportion of LiX; and "b" corresponds to the proportion of $Li_2S$).

As the raw material composition, examples include, but are not limited to, $LiI—Li_2S—SiS_2$, $LiI—Li_2S—P_2S_5$, $LiI—Li_2S—P_2O_5$, $LiI—Li_3PO_4—P_2S_5$, $LiI—Li_2O—Li_2S—P_2S_5$, and $LiBr—LiI—Li_2S—P_2S_5$.

More specifically, examples include, but are not limited to, $15LiBr\cdot10LiI\cdot75(0.75Li_2S\cdot0.25P_2S_5)$ and $70(0.06Li_2O\cdot0.69Li_2S\cdot0.25P_2S_5)\cdot30LiI$. These compositions are on a molar basis.

As the method for amorphizing the raw material composition, examples include, but are not limited to, mechanical milling and a melt-quenching method. The method may be mechanical milling. This is because the raw material composition can be amorphized at normal temperature, and the production process can be simplified.

The melt-quenching method has a limit to a reaction atmosphere or reaction container used. Meanwhile, the mechanical milling is advantageous in that a sulfide glass having a desired composition can be simply and easily synthesized.

The mechanical milling may be dry or wet mechanical milling. The mechanical milling may be the latter. This is because the raw material composition can be prevented from attaching to the inner wall surface of a container, etc., and a sulfide glass with higher amorphous nature can be obtained.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired sulfide glass can be efficiently obtained.

The conditions of the mechanical milling are determined so that the desired sulfide glass can be obtained. For example, in the case of using the planetary ball mill, the raw material composition and grinding balls are put in a container, and mechanical milling is carried out at a predetermined rotational frequency for a predetermined time. In general, the larger the rotational frequency, the faster the production speed of the sulfide glass, and the longer the treatment time, the higher the conversion rate of the raw material composition into the sulfide glass.

In the case of using the planetary ball mill, the plate rotational frequency is in a range of from 200 rpm to 500 rpm, for example. The plate rotational frequency may be in a range of 250 rpm to 400 rpm.

In the case of using the planetary ball mill, the mechanical milling time is in a range of from 1 hour to 100 hours, for example. The mechanical milling time may be in a range of from 1 hour to 50 hours.

As the material of the container and grinding balls used in the ball mill, examples include, but are not limited to, $ZrO_2$ and $Al_2O_3$.

The diameter of the grinding balls is in a range of from 1 mm to 20 mm, for example.

A liquid is used for wet mechanical milling. The liquid may be a liquid that does not produce hydrogen sulfide in a reaction with the raw material composition. Hydrogen sulfide is produced when protons are dissociated from the molecules of the liquid and reacted with the raw material composition or sulfide glass. Therefore, the liquid may have aprotic properties to a degree that does not result in the production of hydrogen sulfide. Aprotic liquids can be broadly classified into polar and non-polar aprotic liquids.

The polar aprotic liquid is not particularly limited. As the polar aprotic liquid, examples include, but are not limited to, ketones such as acetone; nitriles such as acetonitrile; amides such as N,N-dimethylformamide (DMF); and sulfoxides such as dimethylsulfoxide (DMSO).

As the non-polar aprotic liquid, examples include, but are not limited to, aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine compounds such as benzene fluoride, heptane fluoride, 2,3-dihydroperfluoropentane, and 1,1,2,2,3,3,4-heptafluorocyclopentane. The amount of the added liquid is not particularly limited, and it may be an amount to a degree that can obtain the desired sulfide-based solid electrolyte.

The method for producing the sulfide-based solid electrolyte according to the disclosed embodiments comprises at least (1) immersing. As needed, it further comprises (2) heating.

Hereinafter, the immersing and heating will be described in order.

(1) Immersing

The immersing is immersing the sulfide glass-based material, which is at least one of a sulfide glass and a glass ceramic, in an organic solvent having a solubility parameter of 7.0 or more and 8.8 or less, for 1 hour to 100 hours.

By immersing the sulfide glass-based material in the organic solvent, impurities, glass components, unreacted raw materials, etc., on the surface and in the pores of the sulfide glass-based material can be eluted into the organic solvent and removed. Therefore, the surface of the sulfide glass-based material and the inside of the pores of the sulfide glass-based material are roughened, and desired pores can be formed in the sulfide glass-based material.

As a result, it is presumed that the sulfide-based solid electrolyte having the desired porosity is formed, and the chemical stability of the sulfide-based solid electrolyte can be increased.

Also, oxidation of an electrode layer comprising the sulfide-based solid electrolyte is suppressed, and the durability of the electrode layer is increased.

In the immersing, a glass ceramic having a crystallinity of from 60% to 80% may be used as the sulfide glass-based material, because impurities, glass components, unreacted raw materials, etc. on the surface and in the pores of the glass ceramic can be sufficiently eluted into the organic solvent and removed. Meanwhile, when a crystal material having a crystallinity of more than 80% is used in the immersing, it is presumed that impurities, glass components, unreacted raw materials, etc., on the surface and in the pores of the crystal material cannot be sufficiently eluted into the organic solvent, and the desired porosity cannot be obtained unlike the case of using the sulfide glass-based material.

The organic solvent is not particularly limited, as long as it has a solubility parameter of 7.0 or more and 8.8 or less.

The solubility parameter of the disclosed embodiments is the Hansen solubility parameter (HSP). The solubility parameter may be a value by reference to, for example, "Chemical Handbook: Advanced" (revised 3rd edition) published by Maruzen Publishing Co., Ltd, "Handbook of Adhesion" (4th edition) published by Nikkan Kogyo Shimbun Ltd., or "Polymer Data Handbook" edited by The Society of Polymer Science, Japan.

As the organic solvent, examples include, but are not limited to, butyl butyrate (solubility parameter: 8.5), diethyl ether (solubility parameter: 7.4), cyclohexane (solubility parameter: 8.2), toluene (solubility parameter: 8.8), chlorotoluene (solubility parameter: 8.8), hexyl acetate (solubility parameter: 7.2), n-pentane (solubility parameter: 7.0) and n-octane (solubility parameter: 7.5). The organic solvent may be butyl butyrate. The organic solvent may be one kind of organic solvent, or it may be a mixed solvent obtained by mixing two or more kinds of organic solvents. When the organic solvent has a solubility parameter of less than 7.0, it may be difficult to obtain the sulfide-based solid electrolyte having the desired porosity, even if the sulfide glass-based material is immersed therein. Also, a long period of immersion may be needed to obtain the sulfide-based solid electrolyte having the desired porosity.

The amount of the organic solvent used is not particularly limited, as long as it is an amount that allows the sulfide glass-based material to be entirely immersed in the organic solvent.

For the immersing, the immersing time may be 1 hour to 100 hours.

The immersing temperature is not particularly limited. From the viewpoint of ease of handling, the lower limit of the immersing temperature may be 10° C. or more. From the viewpoint of shortening the immersing time, the upper limit may be a temperature less than the boiling point of the organic solvent. From the viewpoint of ease of handling, the upper limit may be 30° C. or less.

The immersing atmosphere may be an inert gas atmosphere such as Ar and $N_2$.

In the immersing, pressure is applied. The pressure is not particularly limited, and it may be the atmospheric pressure.

The sulfide glass-based material to be immersed may be in a sulfide glass state or a glass ceramic state.

(2) Heating

The heating is heating the sulfide glass at a temperature higher than a crystallization temperature (Tc) of the sulfide glass, which is a temperature observed by thermal analysis measurement, thereby obtaining a glass ceramic.

By heating the sulfide glass, the crystallization point of the sulfide-based solid electrolyte is increased; therefore, the crystallinity of the sulfide-based solid electrolyte is increased to increase the ion conductivity of the sulfide-based solid electrolyte.

The crystallization temperature (Tc) of the sulfide glass can be measured by thermal analysis measurement (DTA).

For the heating, the heating temperature may be a temperature higher than the crystallization temperature (Tc) of the sulfide glass, which is a temperature observed by thermal analysis measurement. In general, it is 195° C. or more. The heating temperature may be 200° C. or more, or it may be 205° C. or more. On the other hand, the upper limit of the heating temperature is not particularly limited.

The heating time is not particularly limited, as long as the desired glass ceramic is obtained. For example, it is in a range of from one minute to 24 hours, or it may be in a range of from one minute to 10 hours.

The heating may be carried out in an inert gas atmosphere such as argon gas and nitrogen gas, or it may be carried out in a reduced-pressure atmosphere (especially in a vacuum). This is because a deterioration (e.g., oxidation) of the sulfide-based solid electrolyte can be prevented.

The heating method is not particularly limited. For example, a method using a firing furnace may be used.

In the sulfide-based solid electrolyte obtained by the heating, the sulfide glass may be absolutely formed into a glass ceramic by the heating, or the sulfide glass may fail to be formed into a glass ceramic and may remain in the sulfide-based solid electrolyte. From the viewpoint of increasing ion conductivity, the sulfide glass may be absolutely formed into a glass ceramic.

2. Sulfide-Based Solid Electrolyte

The sulfide-based solid electrolyte according to the disclosed embodiments, is a sulfide-based solid electrolyte comprising a sulfide glass-based material that contains at least one lithium halide compound selected from the group consisting of LiI, LiBr and LiCl, wherein a specific surface area of the sulfide-based solid electrolyte measured by the BET method, is from 10 m$^2$/g to 35 m$^2$/g.

By using the sulfide-based solid electrolyte having a specific surface area of 10 m$^2$/g or more as a material for the electrode layer, the heat dissipating performance of the sulfide-based solid electrolyte is increased. Therefore, the heat generation amount of the electrode layer can be reduced to a desired value or less.

On the other hand, when the BET specific surface area is more than 35 m$^2$/g, the ion conductivity of the sulfide-based solid electrolyte is decreased to less than the desired value, and the performance of the electrode layer is decreased.

Therefore, as long as the BET specific surface area is from 10 m$^2$/g to 35 m$^2$/g, the sulfide-based solid electrolyte obtains a balance between the ion conductivity of the sulfide-based solid electrolyte and the heat generation amount of the electrode layer containing the sulfide-based solid electrolyte during an electrode reaction.

For the specific surface area of the sulfide-based solid electrolyte measured by the BET method, the lower limit is 10 m$^2$/g or more, or it may be more than 10 m$^2$/g or may be 12.7 m$^2$/g or more. The upper limit is 35 m$^2$/g or less, or it may be less than 35 m$^2$/g or may be 33.4 m$^2$/g or less. In the disclosed embodiments, the BET specific surface area is used as an index of the porosity of the sulfide-based solid electrolyte.

The BET specific surface area of the sulfide-based solid electrolyte can be increased by immersing the sulfide-based solid electrolyte in an organic solvent. The type of the organic solvent and the immersing time will not be described here, since they are the same as those described above under "1. Method for producing sulfide-based solid electrolyte".

The sulfide glass-based material contained in the sulfide-based solid electrolyte will not be described here, since it is the same as the sulfide glass-based material described above under "1. Method for producing sulfide-based solid electrolyte".

The sulfide-based solid electrolyte of the disclosed embodiments may contain at least the sulfide glass-based material, or it may be composed of only the sulfide glass-based material.

For the lithium ion conductivity of the sulfide-based solid electrolyte of the disclosed embodiments at normal temperature, the lower limit is 2.0 mS/cm or more, or it may be 2.7 mS/cm or more. The upper limit is not particularly limited and may be 3.9 mS/cm or less.

The crystallinity of the sulfide-based solid electrolyte is not particularly limited. From the viewpoint of increasing ion conductivity, the lower limit is 60% or more, or it may be 69% or more. The upper limit is 80% or less, or it may be 75% or less.

The crystallinity can be measured by an X-ray diffraction method or the like.

The heat generation amount of the electrode layer of the sulfide-based solid electrolyte of the disclosed embodiments, may be as small as possible. From the viewpoint of balance with ion conductivity, the heat generation amount may be from 477 W/g to 753 W/g. The heat generation amount can be measured by use of a differential scanning calorimeter (DSC) or the like.

As the form of the sulfide-based solid electrolyte of the disclosed embodiments, examples include, but are not limited to, a particle form. The average particle diameter ($D_{50}$) of the sulfide-based solid electrolyte in the particle form may be in a range of from 0.1 μm to 50 μm.

In the disclosed embodiments, the average particle diameter of particles is a value measured by laser diffraction/scattering particle size distribution measurement. Also in the disclosed embodiments, the median diameter ($D_{50}$) of particles is a diameter at which, when the particle diameters of the particles are arranged in ascending order, the accumulated volume of the particles is half (50%) the total number of the particles.

The sulfide-based solid electrolyte of the disclosed embodiments can be used in any desired intended application that needs Li ion conductivity. The sulfide-based solid electrolyte may be used in a battery.

Also, the present disclosure can provide a method for producing an all-solid-state battery comprising the above-described sulfide-based solid electrolyte. The sulfide-based solid electrolyte may be used in a cathode layer, an anode layer, or a solid electrolyte layer. The sulfide-based solid electrolyte may be used in a cathode layer.

3. Method for Producing all-Solid-State Battery

The all-solid-state battery production method according to the disclosed embodiments, is a method for producing an all-solid-state battery comprising a cathode layer that contains the sulfide-based solid electrolyte obtained by the above-mentioned production method.

The method for producing the all-solid-state battery of the disclosed embodiments, is not particularly limited, except that the sulfide-based solid electrolyte obtained by the above-described production method, is incorporated in the cathode layer. The all-solid-state battery can be produced by a conventionally known method.

For example, a solid electrolyte layer is formed by pressing a powder of a solid electrolyte material containing a solid electrolyte. On one surface of the solid electrolyte layer, an anode layer is formed by pressing a powder of a material for anode. Then, on the other surface of the solid electrolyte layer, which is a surface opposite to the surface on which the anode layer was formed, a cathode layer is formed by pressing a powder of a material for cathode, the material containing the sulfide-based solid electrolyte obtained by the above-mentioned production method. The thus-obtained cathode layer-solid electrolyte layer-anode layer assembly can be used as the all-solid-state battery.

In this case, press pressure is applied to press the powder of the solid electrolyte material, the powder of the material for anode, and the powder of the material for cathode. The press pressure is generally about 1 MPa or more and about 600 MPa or less.

The pressing method is not particularly limited. As the pressing method, examples include, but are not limited to, a method of applying the press pressure by use of a plate press machine, a roll press machine or the like.

The FIGURE is a schematic sectional view of an example of the all-solid-state battery obtained by the production method of the disclosed embodiments.

As shown in the FIGURE, an all-solid-state battery 100 comprises a cathode 16, an anode 17 and a solid electrolyte layer 11, the cathode 16 including a cathode layer 12 and a cathode current collector 14, the anode 17 including an anode layer 13 and an anode current collector 15, and the solid electrolyte layer 11 being disposed between the cathode 16 and the anode 17.

The cathode comprises at least a cathode layer. As needed, it further comprises a cathode current collector.

The cathode layer contains at least a cathode active material and, as a solid electrolyte, the sulfide-based solid electrolyte obtained by the above-mentioned production method. As needed, it further contains an electroconductive material and a binder.

As the cathode active material, a conventionally known material can be used. When the all-solid-state battery is a lithium battery, for example, an elemental lithium metal, a lithium alloy or a lithium-containing metal oxide can be used as the cathode active material. As the lithium alloy, examples include, but are not limited to, an In—Li alloy. As the lithium-containing metal oxide, examples include, but are not limited to, layered rock salt-type active materials such as $LiCoO_2$, $LiNiO_2$, $LiVO_2$ and $LiNi_{1/3}Co_{1/3}Mn_{1/3}O_2$, spinel-type active materials such as $LiMn_2O_4$ and $Li(Ni_{0.5}Mn_{1.5})O_4$, and olivine-type active materials such as $LiFePO_4$, $LiMnPO_4$, $LiNiPO_4$ and $LiCoPO_4$.

The form of the cathode active material is not particularly limited. As the form, examples include, but are not limited to, a particle form and a plate form.

The content of the cathode active material in the cathode layer is not particularly limited. For example, when the total volume of the cathode layer is determined as 100 vol %, it may be from 50 vol % to 100 vol %.

As the solid electrolyte used in the cathode layer, the same solid electrolyte as the solid electrolyte used in the below-described solid electrolyte layer, may be further used, as long as at least the sulfide-based solid electrolyte obtained by the above-mentioned production method is used.

The content of the solid electrolyte in the cathode layer is not particularly limited. For example, when the total volume of the cathode layer is determined as 100 vol %, it may be from 10 vol % to 50 vol %.

As the electroconductive material, examples include, but are not limited to, carbonaceous materials such as acetylene black and Ketjen black, fibrous carbon such as carbon fiber, and metal materials.

The content of the electroconductive material in the cathode layer is not particularly limited. For example, when the total volume of the cathode layer is determined as 100 vol %, it may be from 0 vol % to 10 vol %.

The binder is not particularly limited. As the binder, examples include, but are not limited to, butadiene rubber (BR), polyvinylidene fluoride (PVdF) and styrene-butadiene rubber (SBR).

The content of the binder in the cathode layer is not particularly limited. For example, when the total volume of the cathode layer is determined as 100 vol %, it may be from 0 vol % to 10 vol %.

The thickness of the cathode layer is not particularly limited. For example, the thickness may be from 10 μm to 250 μm, or it may be from 20 μm to 200 μm.

The method for forming the cathode layer is not particularly limited. As the method, examples include, but are not limited to, a method for forming the cathode layer by pressing the powder of the material for cathode, the material containing the cathode active material, the sulfide-based solid electrolyte obtained by the above-mentioned production method and, as needed, other components.

The cathode current collector functions to collect current from the cathode layer.

As the material for the cathode current collector, examples include, but are not limited to, metal materials such as SUS, Ni, Cr, Au, Pt, Al, Fe, Ti, Zn and Cu.

As the form of the cathode current collector, examples include, but are not limited to, a foil form, a plate form and a mesh form.

The cathode may further comprise a cathode lead connected to the cathode current collector.

The anode comprises at least an anode layer. As needed, it further comprises an anode current collector.

The anode layer contains at least an anode active material. As needed, it further contains a solid electrolyte, an electroconductive material and a binder.

As the anode active material, a conventionally known material can be used. As the anode active material, examples include, but are not limited to, Li metal, graphite, Si, Si alloy and $Li_4Ti_5O_{12}$ (LTO).

As the Si alloy, examples include, but are not limited to, an alloy with a metal such as Li, and an alloy with at least one kind of metal selected from the group consisting of Sn, Ge and Al.

After the all-solid-state battery is assembled, initial charging of the all-solid-state battery is carried out. By the initial charging, Si is reacted with a metal such as Li to form an amorphous alloy. The alloyed part remains amorphous even after metal ions such as lithium ions are released by discharging. In the disclosed embodiments, therefore, the anode layer comprising Si includes Si formed into an amorphous alloy.

The form of the anode active material is not particularly limited. As the form, examples include, but are not limited to, a particle form and a plate form.

The average particle diameter (the median diameter D50 of the volume distribution) of the anode active material particles may be 10 μm or less.

The content of the anode active material in the anode layer is not particularly limited. For example, when the total volume of the anode layer is determined as 100 vol %, it may be from 20 vol % to 100 vol %.

The solid electrolyte used in the anode layer may be the same as the solid electrolyte used in the below-described solid electrolyte layer.

The content of the solid electrolyte in the anode layer is not particularly limited. For example, when the total volume of the anode layer is determined as 100 vol %, it may be from 0 vol % to 80 vol %.

The electroconductive material and binder used in the anode layer may be the same as those used in the cathode layer.

The content of the electroconductive material in the anode layer is not particularly limited. For example, when the total volume of the anode layer is determined as 100 vol %, it may be from 0 vol % to 10 vol %.

The content of the binder in the anode layer is not particularly limited. For example, when the total volume of the anode layer is determined as 100 vol %, it may be from 0 vol % to 10 vol %.

The thickness of the anode layer is not particularly limited. For example, the thickness may be from 10 μm to 100 μm. The thickness may be from 10 μm to 50 μm.

The method for forming the anode layer is not particularly limited. As the method, examples include, but are not limited to, a method for forming the anode layer by pressing the powder of the material for anode, the material containing the anode active material and, as needed, other components.

The anode current collector functions to collect current from the anode layer.

As the material for the anode current collector, the same material as the material for the cathode current collector may be used.

As the form of the anode current collector, the same form as the form of the cathode current collector may be used.

The anode may further comprise an anode lead connected to the anode current collector.

The solid electrolyte layer contains at least a solid electrolyte. As needed, it may further contain a binder, etc.

As the solid electrolyte used in the solid electrolyte layer, examples include, but are not limited to, an oxide-based solid electrolyte material and a sulfide-based solid electrolyte material.

As the sulfide-based solid electrolyte material, the sulfide-based solid electrolyte obtained by the production method of the disclosed embodiments may be used, or a different material may be used. As the sulfide-based solid electrolyte material, examples include, but are not limited to, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2O$—$Li_2S$—$P_2S_5$, $LiBr$—$LiI$—$Li_2S$—$P_2S_5$, and $Li_2S$—$P_2S_5$.

More specifically, examples include, but are not limited to, $Li_7P_3S_{11}$, $Li_3PS_4$, $Li_8P_2S_9$, $Li_{13}GeP_3Si_6$, $Li_{10}GeP_2Si_2$, 15LiBr·10LiI·75(0.75$Li_2S$·0.25$P_2S_5$) and 70(0.06$Li_2O$·0.69$Li_2S$·0.25$P_2S_5$)·30LiI. These compositions are on a molar basis. As the oxide-based solid electrolyte material, examples include, but are not limited to, $Li_{6.25}La_3Zr_2Al_{0.25}O_{12}$, $Li_3PO_4$ and $Li_{3+x}PO_{4-x}N_x$ (LiPON).

As the solid electrolyte, one kind of solid electrolyte may be used alone, or two or more kinds of solid electrolytes may be used. In the case of using two or more kinds of solid electrolytes, they may be mixed together, or each solid electrolyte may be formed into a layer, thereby obtaining a multilayered structure.

The solid electrolyte may be any one of a glass, a glass ceramic having a crystallinity of from 60% to 80%, and a crystal material having a crystallinity of more than 80%. From the viewpoint of increasing lithium ion conductivity, the solid electrolyte may be a glass ceramic.

The form of the solid electrolyte is not particularly limited. As the form, examples include, but are not limited to, a particle form and a plate form. The solid electrolyte may be in a particle form.

The proportion of the solid electrolyte in the solid electrolyte layer is not particularly limited. For example, the proportion may be 50 mass % or more, may be in a range of from 60 mass % to 100 mass %, may be in a range of from 70 mass % to 100 mass %, or may be 100 mass %.

As the method for forming the solid electrolyte layer, examples include, but are not limited to, a method for forming the solid electrolyte layer by pressing the powder of the solid electrolyte material containing the solid electrolyte and, as needed, other components. In the case of pressing the powder of the solid electrolyte material, generally, a press pressure of about 1 MPa or more and about 400 MPa or less is applied.

The binder used in the solid electrolyte layer may be the same as the binder used in the above-described cathode layer.

The thickness of the solid electrolyte layer is generally about 0.1 μm or more and about 1 mm or less.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is stable in electrolytes. As the material, examples include, but are not limited to, resins such as polypropylene, polyethylene and acrylic resins.

As the all-solid-state battery, examples include, but are not limited to, a lithium ion battery, a sodium battery, a magnesium battery and a calcium battery. The all-solid-state battery may be a lithium ion battery.

As the form of the all-solid-state battery, examples include, but are not limited to, a coin form, a laminate form, a cylindrical form and a square form.

EXAMPLES

Comparative Example 1

The following experiment was carried out in a glove box under an Ar gas atmosphere at a dew point of −70° C. or less, unless otherwise stated.

As starting materials, lithium sulfide ($Li_2S$, manufactured by Mitsuwa Chemicals Co., Ltd.), diphosphorus pentasulfide ($P_2S_5$, manufactured by Aldrich), lithium iodide (LiI, manufactured by Aldrich) and lithium bromide (LiBr, manufactured by Aldrich) were used.

The raw materials were weighed out according to the following composition formula: 10LiI·15LiBr·75(0.75$Li_2S$·0.25$P_2S_5$) (mol %). Then, the raw materials were mixed to obtain a mixture.

Next, 1 g of the mixture and 500 $ZrO_2$ balls (diameter 4 mm) were put in a $ZrO_2$ container (45 mL). Then, the container was hermetically closed.

The container was installed in a planetary ball mill (product name: P-7, manufactured by: Fritsch) and subjected to mechanical milling at a plate rotational frequency of 510 rpm for 45 hours, thereby obtaining a sulfide glass.

Under an Ar gas atmosphere, the sulfide glass was heated at a higher temperature (200° C. to 350° C.) than the crystallization temperature (Tc) of the sulfide glass measured by thermal analysis measurement, thereby obtaining a glass ceramic. The composition of the thus-obtained glass ceramic was 10LiI·15LiBr·75(0.75$Li_2S$·0.25$P_2S_5$) on a molar basis. The thus-obtained glass ceramic was deemed as the sulfide-based solid electrolyte of Comparative Example 1. The BET specific surface area and crystallinity of the thus-obtained sulfide-based solid electrolyte were measured. The results are shown in Table 1.

Example 1

A grass ceramic was obtained in the same manner as Comparative Example 1. The glass ceramic was immersed in butyl butyrate for one hour for elution and removal of impurities, glass components and unreacted raw materials, thereby obtaining a sulfide-based solid electrolyte. The BET specific surface area and crystallinity of the thus-obtained sulfide-based solid electrolyte were measured. The results are shown in Table 1.

Example 2

A glass ceramic was obtained in the same manner as Comparative Example 1. The glass ceramic was immersed in butyl butyrate for 54 hours, thereby obtaining a sulfide-based solid electrolyte. The BET specific surface area and crystallinity of the thus-obtained sulfide-based solid electrolyte were measured. The results are shown in Table 1.

Example 3

A glass ceramic was obtained in the same manner as Comparative Example 1. The glass ceramic was immersed in butyl butyrate for 100 hours, thereby obtaining a sulfide-based solid electrolyte. The BET specific surface area and crystallinity of the thus-obtained sulfide-based solid electrolyte were measured. The results are shown in Table 1.

Comparative Example 2

A glass ceramic was obtained in the same manner as Comparative Example 1. The glass ceramic was immersed in butyl butyrate for 200 hours, thereby obtaining a sulfide-based solid electrolyte. The BET specific surface area and crystallinity of the thus-obtained sulfide-based solid electrolyte were measured. The results are shown in Table 1.

Comparative Example 3

A glass ceramic was obtained in the same manner as Comparative Example 1. The glass ceramic was immerse in butyl butyrate for 1000 hours, thereby obtaining a sulfide-based solid electrolyte. The BET specific surface area and crystallinity of the thus-obtained sulfide-based solid electrolyte were measured. The results are shown in Table 1.

(Li ion conductivity measurement) For each of the sulfide-based solid electrolytes produced in Examples 1 to 3 and Comparative Examples 1 to 3, the Li ion conductivity was measured by the following method. The results are shown in Table 1.

First, the sulfide-based solid electrolyte was cold-pressed at a pressure of 4 ton/cm$^2$, thereby producing pellets having a diameter of 11.29 mm and a thickness of about 500 μm. Next, the pellets were placed in a container under an inert atmosphere filled with Ar gas. Then, the Li ion conductivity of the pellets was measured.

For the Li ion conductivity measurement, an impedance/gain-phase analyzer SI1260 (manufactured by Solartron Analytical) was used.

[Production of all-Solid-State Battery]

The sulfide-based solid electrolyte produced in Example 1, $LiNi_{3/5}Co_{1/5}Mn_{1/5}O_2$ (NCM) as a cathode active material, and VGCF (trade name, manufactured by Showa Denko K.K.) as an electroconductive material, were mixed to produce a material for cathode.

In a material for anode, silicon was used as an anode active material.

In a material for solid electrolyte layer, the glass ceramic produced in Comparative Example 1 was used as a solid electrolyte.

The material for cathode, the material for solid electrolyte layer, and the material for anode were stacked in this order and pressed, thereby producing an all-solid-state battery in which a cathode layer, a solid electrolyte layer and an anode layer were disposed in this order.

The thus-obtained all-solid-state battery was charged. Then, the cathode layer, which was in the form of pellets, was taken out from the charged all-solid-state battery. The heat generation amount of the cathode layer was measured by use of a differential scanning calorimeter (DSC). The result is shown in Table 1.

All-solid-state batteries were produced in the same manner as above, using the sulfide-based solid electrolytes of Examples 2 and 3 and Comparative Examples 1 to 3. For each all-solid-state battery, the heat generation amount of the cathode layer was measured in the same manner as above. The results are shown in Table 1.

TABLE 1

| | Immersing time (hr) | BET specific surface area (m$^2$/g) | Li ion conductivity (mS/cm) | Crystallinity (%) | Heat generation amount (W/g) |
|---|---|---|---|---|---|
| Comparative Example 1 | 0 | 6.7 | 4.5 | 65 | 1059 |
| Example 1 | 1 | 12.7 | 3.9 | 69 | 753 |
| Example 2 | 54 | 21.5 | 3.5 | 70 | 598 |
| Example 3 | 100 | 33.4 | 2.7 | 75 | 477 |
| Comparative Example 2 | 200 | 39.2 | 1.2 | 79 | 316 |
| Comparative Example 3 | 1000 | 43.2 | 0.9 | 80 | 287 |

As shown in Table 1, it was revealed that by the immersing, both an increase in specific surface area and an increase in crystallinity are achieved at the same time.

Also, it was proved that as long as the immersing time is in a range of from 1 hour to 100 hours or the BET specific surface area is in a range of from 12.7 m$^2$/g to 33.4 m$^2$/g, the sulfide-based solid electrolyte obtains a balance between the lithium ion conductivity of the sulfide-based solid electrolyte and the heat generation amount of the cathode layer containing the sulfide-based solid electrolyte.

REFERENCE SIGNS LIST

11. Solid electrolyte layer
12. Cathode layer
13. Anode layer
14. Cathode current collector
15. Anode current collector
16. Cathode
17. Anode
100. All-solid-state battery

The invention claimed is:

1. A method for producing a sulfide-based solid electrolyte comprising a sulfide glass-based material that contains at least one lithium halide compound selected from the group consisting of LiI, LiBr and LiCl, the method comprising immersing the sulfide glass-based material, which is at least one sulfide glass-based material selected from the group consisting of a sulfide glass and a glass ceramic, in an organic solvent having a solubility parameter of 7.0 or more and 8.8 or less, for 1 hour to 100 hours, thereby forming the sulfide glass-based material into a porous sulfide glass-based material, wherein the organic solvent is at least one selected from the group consisting of butyl butyrate, diethyl ether, cyclohexane, toluene, chlorotoluene, hexyl acetate, n-pentane, and n-octane, wherein, when the sulfide glass-based material is a sulfide glass, the method further comprises heating the sulfide glass at a temperature higher than a crystallization temperature (Tc) of the sulfide glass, which is a temperature observed by thermal analysis measurement, thereby obtaining a glass ceramic, wherein a specific surface area of the porous sulfide glass-based material measured by the BET method, is from 10 $m^2/g$ to 35 $m^2/g$, and wherein a crystallinity of the sulfide-based solid electrolyte is 60% or more and 80% or less.

2. The method for producing the sulfide-based solid electrolyte according to claim 1, wherein the organic solvent is butyl butyrate.

3. A method for producing an all-solid-state battery comprising a cathode layer that contains the sulfide-based solid electrolyte obtained by the production method defined by claim 1.

* * * * *